United States Patent
Dalir et al.

(10) Patent No.: US 11,921,037 B2
(45) Date of Patent: Mar. 5, 2024

(54) VERTICAL PHOTONIC CRYSTAL WAVEGUIDE FOR GAS DETECTION

(71) Applicant: Omega Optics, Inc., Austin, TX (US)

(72) Inventors: Hamed Dalir, Austin, TX (US); Ray T. Chen, Austin, TX (US); Mohammad H. Teimourpour, Austin, TX (US); Jason Midkiff, Austin, TX (US)

(73) Assignee: Omega Optics, Inc., Austin, TX (US)

( * ) Notice: Subject to any disclaimer, the term of this patent is extended or adjusted under 35 U.S.C. 154(b) by 308 days.

(21) Appl. No.: 17/195,542

(22) Filed: Mar. 8, 2021

(65) Prior Publication Data

US 2021/0278339 A1 Sep. 9, 2021

Related U.S. Application Data (60) Provisional application No. 62/986,548, filed on Mar. 6, 2020.

(51) Int. Cl.
*G01N 21/3504* (2014.01)
*G01N 21/17* (2006.01)

(52) U.S. Cl.
CPC ..... *G01N 21/3504* (2013.01); *G01N 21/1702* (2013.01); *G01N 2021/1704* (2013.01); *G01N 2201/06113* (2013.01); *G01N 2201/062* (2013.01)

(58) Field of Classification Search
CPC ............... G01N 21/17; G01N 21/3504; G01N 21/1702; G01N 2021/1704; G01N 2201/06113; G01N 2201/062; G01N 21/0303
See application file for complete search history.

(56) References Cited

U.S. PATENT DOCUMENTS

| 2002/0041749 A1* | 4/2002 | Johnson | G02B 6/13 385/129 |
| 2006/0285114 A1* | 12/2006 | Cao | G01N 21/3504 356/440 |

* cited by examiner

*Primary Examiner* — Benjamin R Schmitt
(74) *Attorney, Agent, or Firm* — Taboada Law Firm, PLLC; John M. Taboada (57) ABSTRACT

Methods and apparatuses for gas detection are disclosed, including providing a device comprising: a light source configured to emit light; an array of vertical photonic crystal waveguides (VPCWs), wherein the VPCWs of the array of VPCWs are configured to slow and guide the light; and a detector array, wherein the detectors of the detector array are configured to measure the intensity of the light passing through each of the VPCWs of the array of VPCWs; wherein the VPCWs of the array of VPCWs slow and guide light having a wavelength within the absorption bands of the one or more gas species to be detected; exposing the apparatus to a gaseous environment such that gas from the environment flows through the array of VPCWs; and reading values from the detectors of the detector array to identify the presence of the one or more gas species. Other embodiments are described and claimed.

10 Claims, 7 Drawing Sheets

VERTICAL PHOTONIC CRYSTAL WAVEGUIDE FOR GAS DETECTION

I. CROSS REFERENCE TO RELATED APPLICATIONS

This application claims the benefit of the filing date of U.S. Provisional Patent Application Ser. No. 62/986,548, filed on Mar. 6, 2020, entitled "Vertical Photonic Crystal Waveguide for Gas Detection," the entire disclosure of which is hereby incorporated by reference into the present disclosure.

STATEMENT REGARDING FEDERALLY SPONSORED RESEARCH

The U.S. Government has a paid-up license in this invention and the right in limited circumstances to require the patent owner to license others on reasonable terms as provided for by the terms of the small business innovation research (SBIR) Contract No. W911NF-18-C-0085 awarded by the Department of Defense (DOD) funding agency, the Army Research Laboratory.

II. BACKGROUND

Field of the Invention

The present disclosure relates generally to the field of on-chip spectroscopy using photonic crystals waveguides (PCW), and more specifically to an apparatus and method for multi-gas detection and identification using an array of air-guiding, hollow-core, vertical photonic crystal waveguides as the sensing elements.

III. SUMMARY

In one respect, disclosed is an apparatus for gas detection comprising: a light source, the light source configured to emit light; an array of vertical photonic crystal waveguides, wherein the vertical photonic crystal waveguides of the array of vertical photonic crystal waveguides are configured to slow and guide the light emitted from the light source; and a detector array, wherein the detectors of the detector array are configured to measure the intensity of the light passing through each of the vertical photonic crystal waveguides of the array of vertical photonic crystal waveguides; wherein the vertical photonic crystal waveguides of the array of vertical photonic crystal waveguides slow and guide light having a wavelength within the absorption bands of the one or more gas species to be detected.

In another embodiment, disclosed is a method for gas detection, comprising: providing an apparatus comprising: a light source, the light source configured to emit light; an array of vertical photonic crystal waveguides, wherein the vertical photonic crystal waveguides of the array of vertical photonic crystal waveguides are configured to slow and guide the light emitted from the light source; and a detector array, wherein the detectors of the detector array are configured to measure the intensity of the light passing through each of the vertical photonic crystal waveguides of the array of vertical photonic crystal waveguides; wherein the vertical photonic crystal waveguides of the array of vertical photonic crystal waveguides slow and guide light having a wavelength within the absorption bands of the one or more gas species to be detected; exposing the apparatus to a gaseous environment such that gas from the environment flows through the array of vertical photonic crystal waveguides; and reading values from the detectors of the detector array to identify the presence of the one or more gas species.

Numerous additional embodiments are also possible.

IV. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Figure 1:
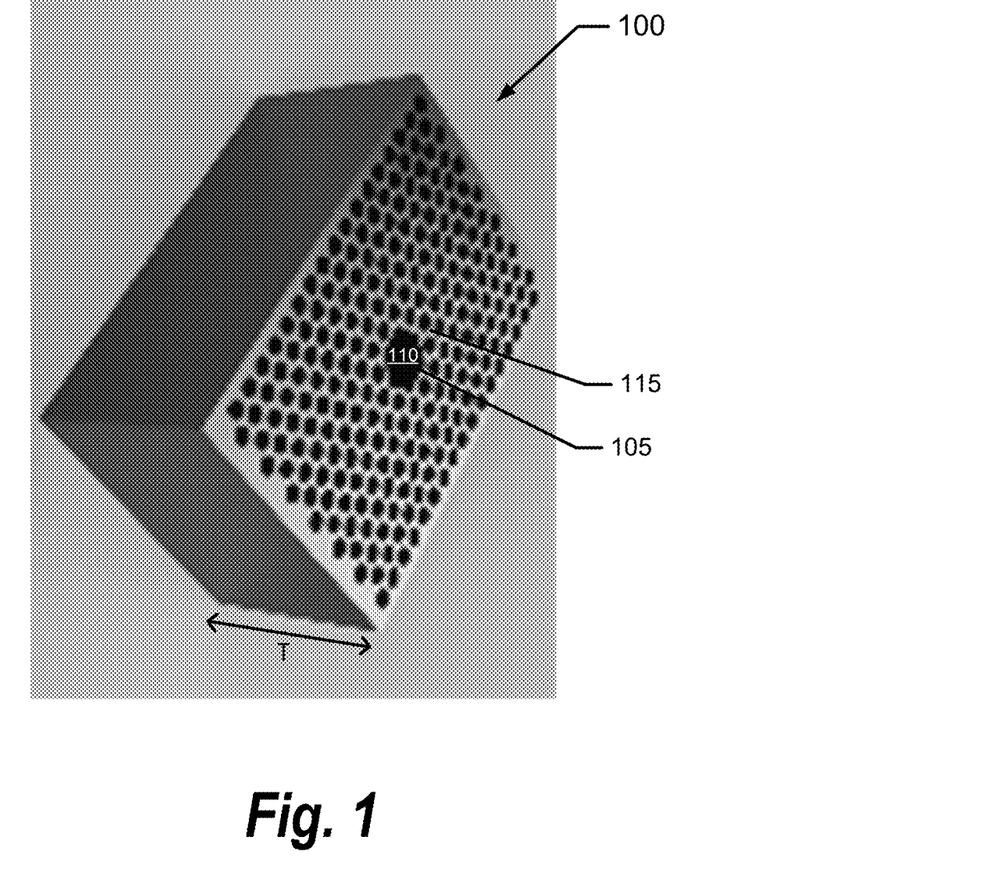
FIG. 1 is a schematic illustration of a single vertical photonic crystal waveguide, in accordance with some embodiments.

FIG. 1 is a schematic illustration of a single vertical photonic crystal waveguide, in accordance with some embodiments.

Figure 2:
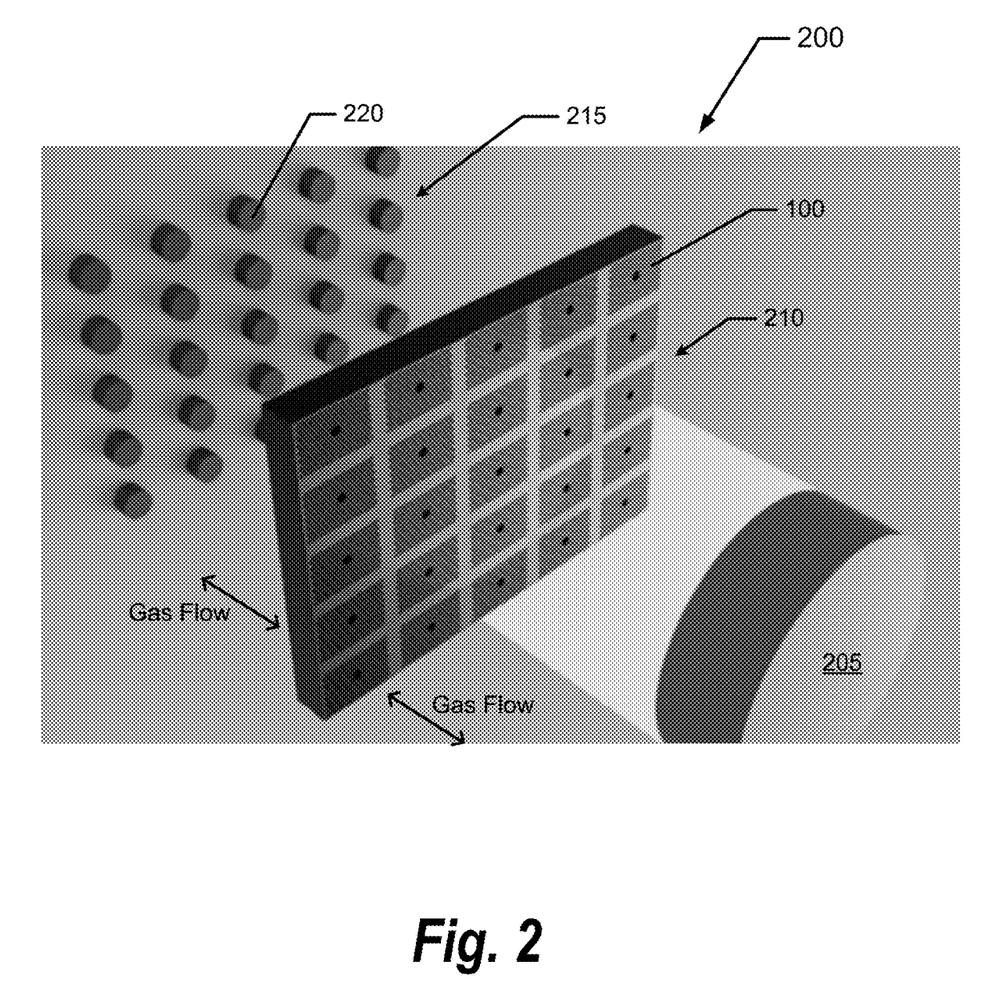
FIG. 2 is a schematic illustration of a multi-gas sensing device comprising an LED light source, a 5×5 array of gas selective, air-guiding, hollow-core vertical photonic vertical photonic crystal waveguides, and an array of detectors, in accordance with some embodiments.

FIG. 2 is a schematic illustration of a multi-gas sensing device comprising an LED light source, a 5×5 array of gas selective, air-guiding, hollow-core vertical photonic vertical photonic crystal waveguides, and an array of detectors, in accordance with some embodiments.

Photonic crystals waveguides offer an ideal platform for on-chip Mid-IR spectroscopy. In a PCW, the slowdown of light drastically increases the interaction time between the analyte and the propagating optical mode. In addition, there is an enhanced optical mode overlap with the analyte at the center of the PCW. Disclosed herein is a multi-gas detection device comprising an array of air-guiding hollow-core photonic bandgap crystal waveguides as the sensing elements. Selectivity is achieved by filtering the wavelength of the guided mode. Each element of the vertical photonic bandgap crystal waveguide array serves as a narrow band pass filter to guide light with a specific wavelength that can be used to identify a single gas specie. The specific guided wavelength depends on the properties of the VPCW, such as period and radius to period ratio of the hexagonal lattice structure, of each vertical photonic crystal waveguide. In some embodiments, in a vertical photonic crystal, as illustrated in FIG. 1, the central defect 105 of a single vertical photonic bandgap crystal 100 comprises a low-index air hole 110, and the modes are guided by Bragg reflection from the cladding layers 115. The guiding mechanism is the main difference between photonic crystal bandgap waveguides and photonic crystal fibers. In photonic crystal fibers, the central defect is a high index region, and the mode is guided by conventional total internal reflection (TIR). FIG. 1 shows the schematic illustration of a single vertical photonic crystal waveguide. The single vertical photonic crystal waveguide may have dimensions of approximately 100 μm×100 μm with a thickness, T, of approximately 10 to 100 μm. The photonic crystals waveguides may be Si based or other high index material such as InP and GaAs as long as the material exhibits the required optical transparency required for the desired gas specie detection. FIG. 2 illustrates the schematic of a gas sensing device 200 comprising a light source 205, such as an LED light source, a tunable laser, or an array of LEDS or lasers, an array of VPCWs 210, and a detector array 215. Each of the single vertical photonic crystal waveguides 100 of the 5×5 array of VPCWs 210 may be designed to detect a particular gas specie. The gas will be flowing through the array of VPCW and each of the detectors 220 of the detector array 215 will then be able to detect the presence of the particular gas specie that the vertical photonic crystal waveguides are designed to detect. If a particular gas specie is present, the optical absorption band of the particular band will be detected by the particular detector positioned to monitor the light passing through the VPCW designed to guide light with the specific wavelength to identify a particular gas specie. If the gas specie is present, the light detected by the detector will be reduced due to the absorption from the particular gas specie which is made possible in such a device by the VPCW slowing down the light tens of thousands of times, approximately 60,000 times, as compared with speed of light in air. Thus, the apparatus is capable of multi-gas specie detection without having to use a spectrometer, making it possible to have a compact and portable device. Additionally, the VPCW may be formed in a single lithographic step, unlike conventional 2D photonic devices which require multiple lithographic steps.

Figure 3:
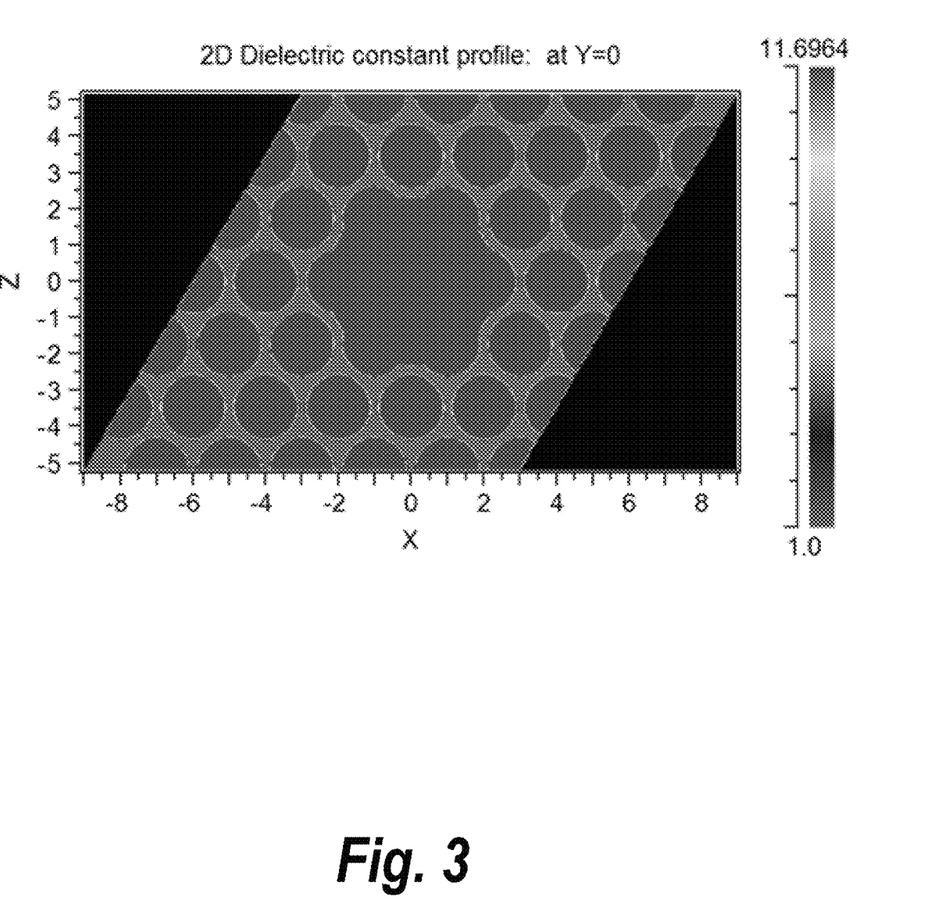
FIG. 3 is a dielectric constant profile of the air-guiding, hollow-core vertical photonic crystal waveguide with a hexagonal lattice structure, in accordance with some embodiments.

FIG. 3 is a dielectric constant profile of the air-guiding, hollow-core vertical photonic crystal waveguide with a hexagonal lattice structure, in accordance with some embodiments.

Figure 4:
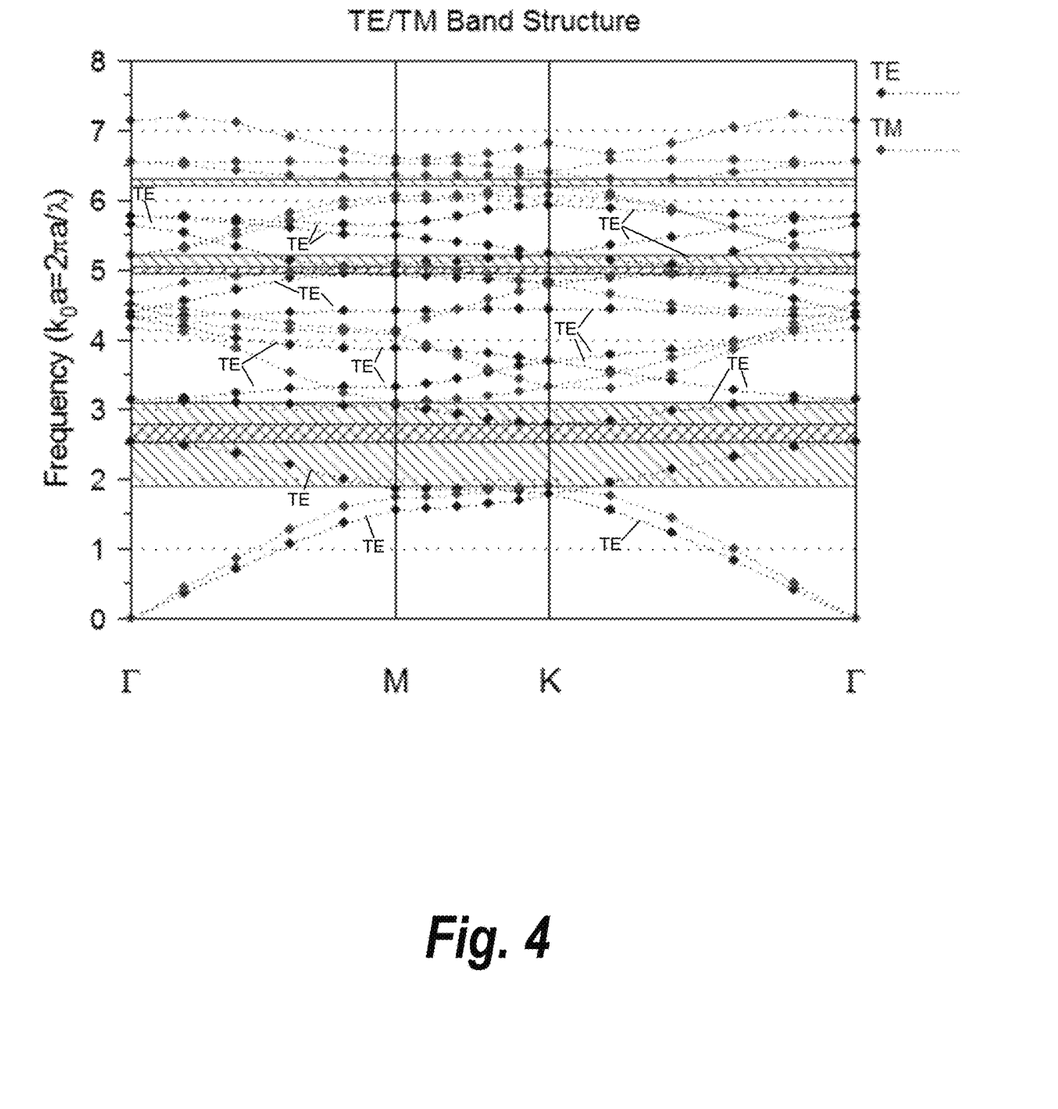
FIG. 4 is a graph of the calculated band structure for the air-guiding, hollow-core vertical photonic crystal waveguide at the wavelength of 4.6 µm, in accordance with some embodiments.

FIG. 4 is a graph of the calculated band structure for the air-guiding, hollow-core vertical photonic crystal waveguide at the wavelength of 4.6 μm, in accordance with some embodiments.

Figure 5:
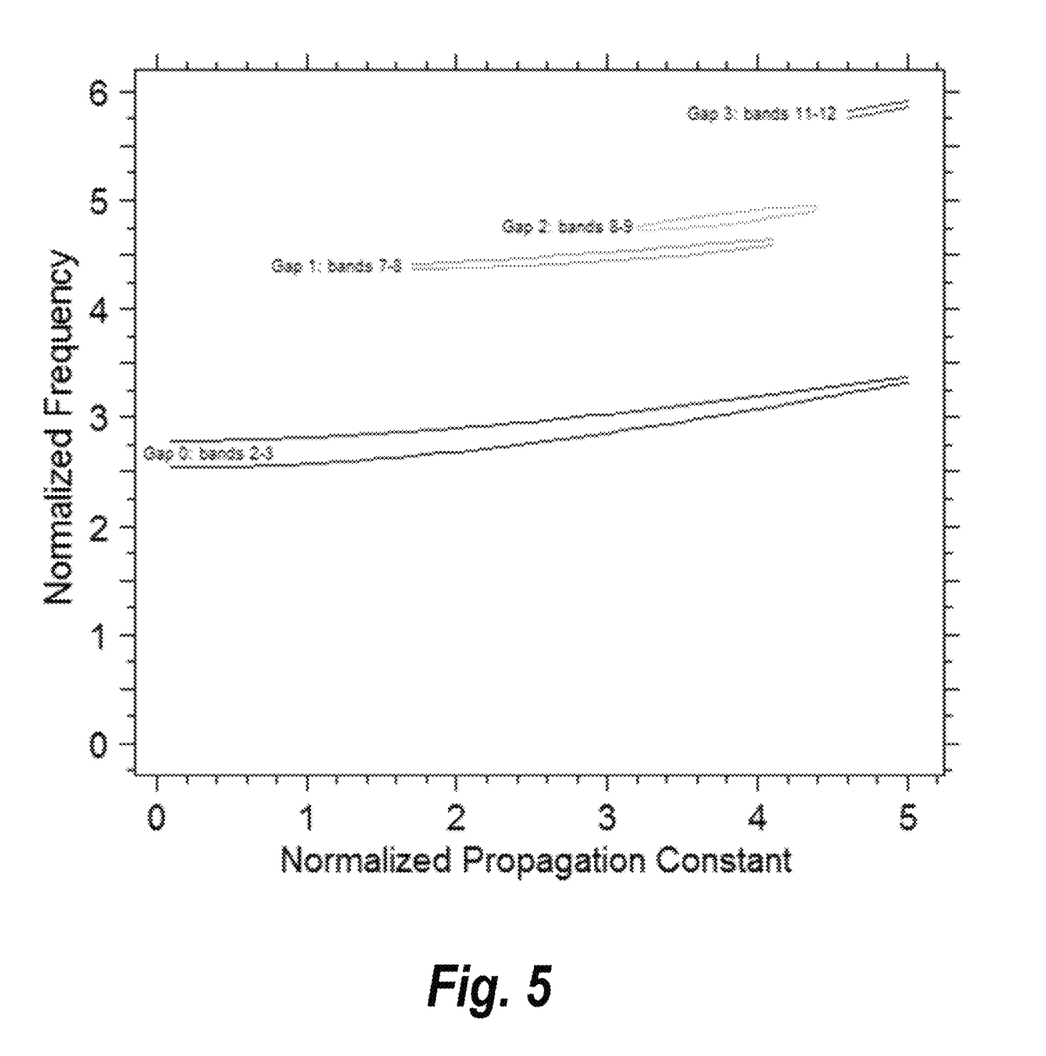
FIG. 5 is a graph of the normalized frequency versus normalized propagation constant for the air-guiding, hollow-core vertical photonic crystal waveguide which show finger-like band gaps extending all the way to zero group velocity at $\beta=0$, in accordance with some embodiments.

FIG. 5 is a graph of the normalized frequency versus normalized propagation constant for the air-guiding, hollow-core vertical photonic crystal waveguide which show finger-like band gaps extending all the way to zero group velocity at $\beta=0$, in accordance with some embodiments.

Figure 6:
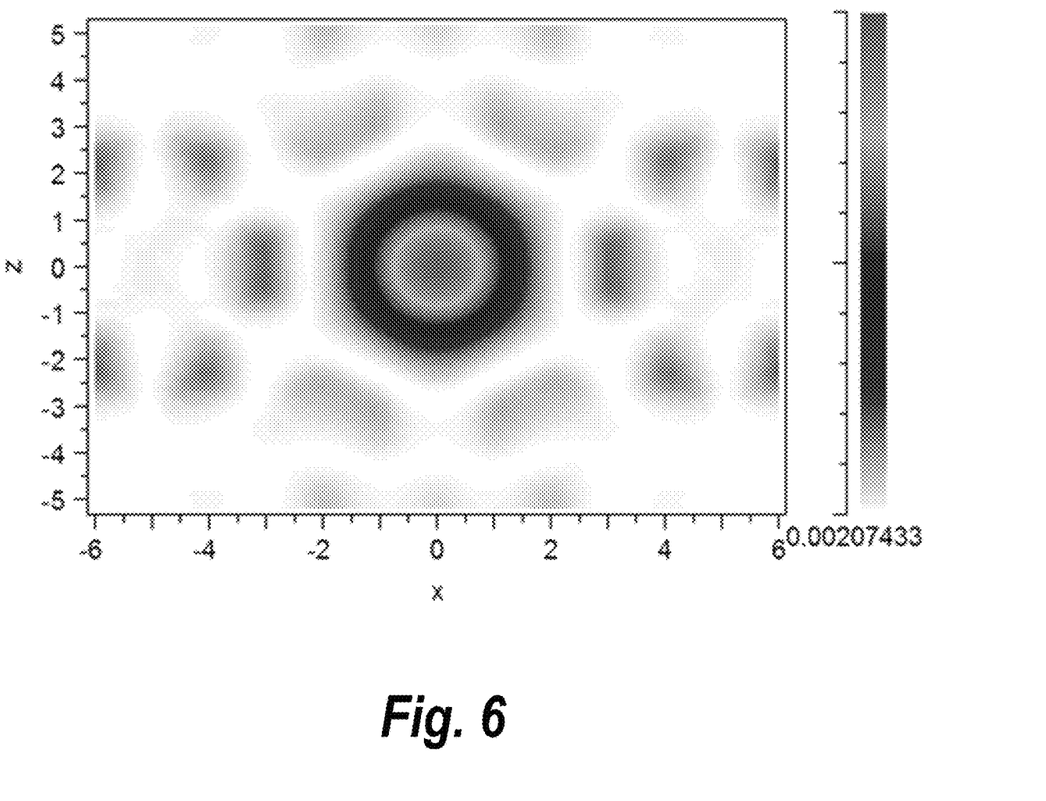
FIG. 6 is a graph showing the mode confined to the hollow core waveguide of the air-guiding, hollow-core vertical photonic crystal waveguide, in accordance with some embodiments.

FIG. 6 is a graph showing the mode confined to the hollow core waveguide of the air-guiding, hollow-core vertical photonic crystal waveguide, in accordance with some embodiments.

FIG. 3 and FIG. 4 show numerical simulation results for the VPCW structure using the BandSolve™ package of the RSoft Photonic Device Tools from Synopsys®. FIG. 3 shows the 2-dimensional dielectric constant profile of the hollow-core photonic bandgap crystal waveguide with a hexagonal lattice structure in a Si platform with a period of 2 μm and a radius to period ratio of 0.45. FIG. 4 plots the band structure for the hexagonal photonic crystal. Unlike low index contrast geometries where "finger-like" band gaps are observed and they close before reaching a zero propagation constant $\beta$, in the VPCW structure, the index contrast is high enough to support a complete band gap for all polarizations in two dimensions extending from $\beta=0$ to nonzero $\beta$. Generally, geometries that support an overlapping TE/TM gap at $\beta=0$ are expected to have the bandgap for a nonzero range of $\beta$, even after the TE/TM distinction disappears. FIG. 5 shows finger-like band gaps extending all the way to zero propagation constant $\beta$. The advantage of these gaps is that they can support guided modes that have a zero-group velocity at $\beta=0$. The slow-light modes close to the zero-velocity band edge will drastically enhance light matter interaction which leads to much larger effective interaction length and consequently higher sensitivities in gas sensing applications. FIG. 6 shows the mode confined to the hollow core waveguide.

Figure 7:
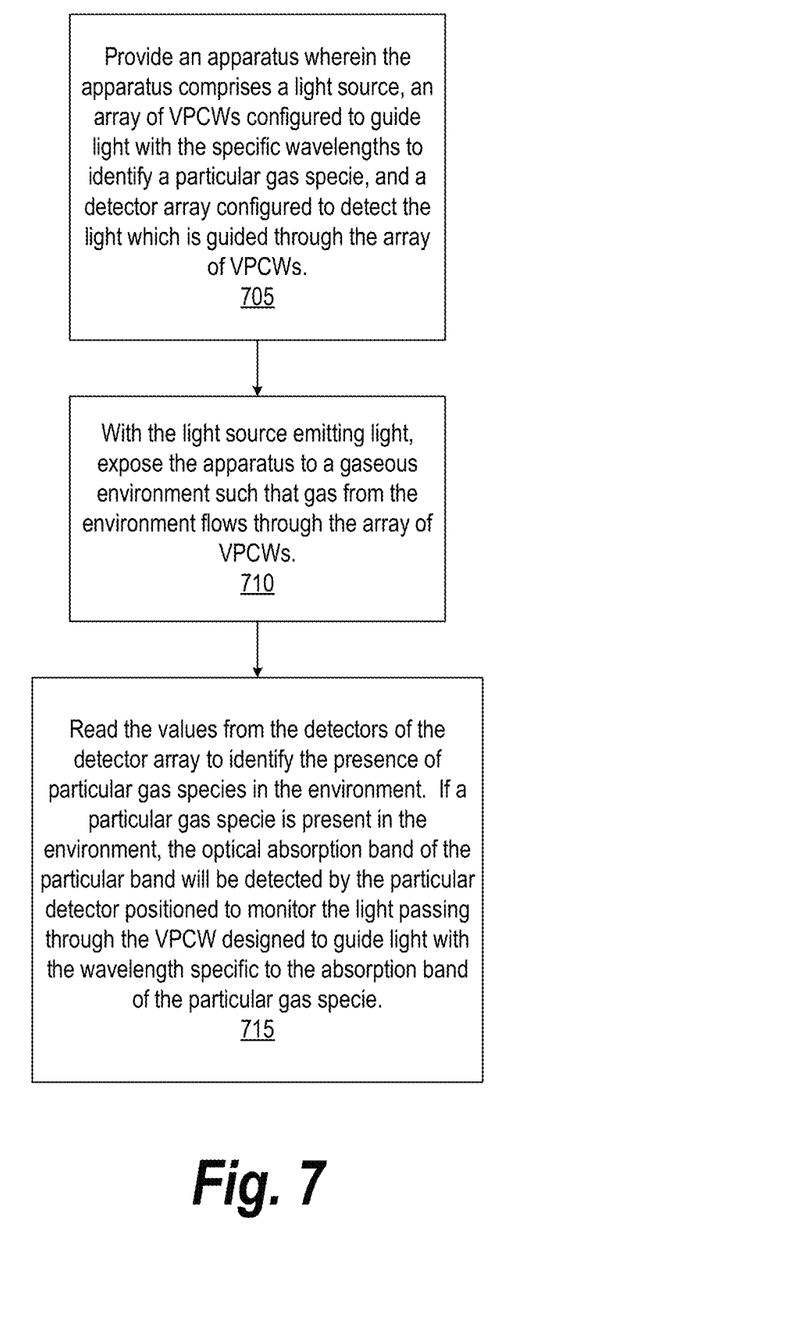
FIG. 7 is a block diagram illustrating a method for gas detection with a device comprising an LED light source, an array of gas selective, air-guiding, hollow-core vertical photonic vertical photonic crystal waveguides, and an array of detectors, in accordance with some embodiments.

FIG. 7 is a block diagram illustrating a method for gas detection with a device comprising an LED light source, an array of gas selective, air-guiding, hollow-core vertical photonic vertical photonic crystal waveguides, and an array of detectors, in accordance with some embodiments. In some embodiments, the method illustrated in FIG. 7 may be performed by one or more of the devices illustrated in FIG. 1 and FIG. 2.

In some embodiments, processing begins at step 705 where an apparatus is provided wherein the apparatus comprises a light source, an array of VPCWs configured to guide light with the specific wavelengths to identify a particular gas specie, and a detector array configured to detect the light which is guided through the array of VPCWs. At step 710, with the light source emitting light, the apparatus is exposed to a gaseous environment such that gas from the environment flows through the array of VPCWs. At step 715, read the values from the detectors of the detector array to identify the presence of particular gas species in the environment. If a particular gas specie is present in the environment, the optical absorption band of the particular band will be detected by the particular detector positioned to monitor the light passing through the VPCW designed to guide light with the wavelength specific to the absorption band of the particular gas specie.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. An apparatus for gas detection comprising:
   a light source, the light source configured to emit light;
   an array of air-guided, hollow-core vertical photonic crystal waveguides, wherein the air-guided, hollow-core vertical photonic crystal waveguides of the array of air-guided, hollow-core vertical photonic crystal waveguides are configured to slow and guide the light emitted from the light source within the air-guiding, hollow-cores of the air-guided, hollow-core vertical photonic crystal waveguides of the array of air-guided, hollow-core vertical photonic crystal waveguides; and
   a detector array, wherein the detectors of the detector array are configured to measure the intensity of the light passing through each of the air-guided, hollow-core vertical photonic crystal waveguides of the array of air-guided, hollow-core vertical photonic crystal waveguides;
   wherein the air-guided, hollow-core vertical photonic crystal waveguides of the array of air-guided, hollow-core vertical photonic crystal waveguides slow and guide light having a wavelength within the absorption bands of the one or more gas species to be detected.

2. The apparatus of claim 1, wherein the air-guided, hollow-core vertical photonic crystal waveguides of the array of air-guided, hollow-core vertical photonic crystal waveguides support a complete band gap for all polarizations in two dimensions extending from $\beta=0$ to nonzero $\beta$.

3. The apparatus of claim 1, wherein the light source comprises an LED.

4. The apparatus of claim 1, wherein the light source comprises a tunable laser.

5. The apparatus of claim 1, wherein the light source comprises an array of LEDS or an array of lasers.

6. A method for gas detection, comprising:
   providing an apparatus comprising:
   i) a light source, the light source configured to emit light;
   ii) an array of air-guided, hollow-core vertical photonic crystal waveguides, wherein the air-guided, hollow-core vertical photonic crystal waveguides of the array of air-guided, hollow-core vertical photonic crystal waveguides are configured to slow and guide the light emitted from the light source within the air-guiding, hollow-cores of the air-guided, hollow-core vertical photonic crystal waveguides of the array of air-guided hollow-core vertical photonic crystal waveguides; and
   iii) a detector array, wherein the detectors of the detector array are configured to measure the intensity of the light passing through each of the air-guided, hollow-core vertical photonic crystal waveguides of the array of air-guided, hollow-core vertical photonic crystal waveguides;
   iv) wherein the air-guided, hollow-core vertical photonic crystal waveguides of the array of air-guided, hollow-core vertical photonic crystal waveguides slow and guide light having a wavelength within the absorption bands of the one or more gas species to be detected;
   exposing the apparatus to a gaseous environment such that gas from the environment flows through the array of air-guided, hollow-core vertical photonic crystal waveguides; and
   reading values from the detectors of the detector array to identify the presence of the one or more gas species.

7. The method of claim 6, wherein the air-guided, hollow-core vertical photonic crystal waveguides of the array of air-guided, hollow-core vertical photonic crystal waveguides support a complete band gap for all polarizations in two dimensions extending from $\beta=0$ to nonzero $\beta$.

8. The method of claim 6, wherein the light source comprises an LED.

9. The method of claim 6, wherein the light source comprises a tunable laser.

10. The method of claim 6, wherein the light source comprises an array of LEDS or an array of lasers.

* * * * *